(No Model.)
G. C. MANDLEBERG, H. L. ROTHBAND &
S. L. MANDLEBERG.
PROCESS OF MANUFACTURING RUBBER GOODS.
No. 441,503. Patented Nov. 25, 1890.
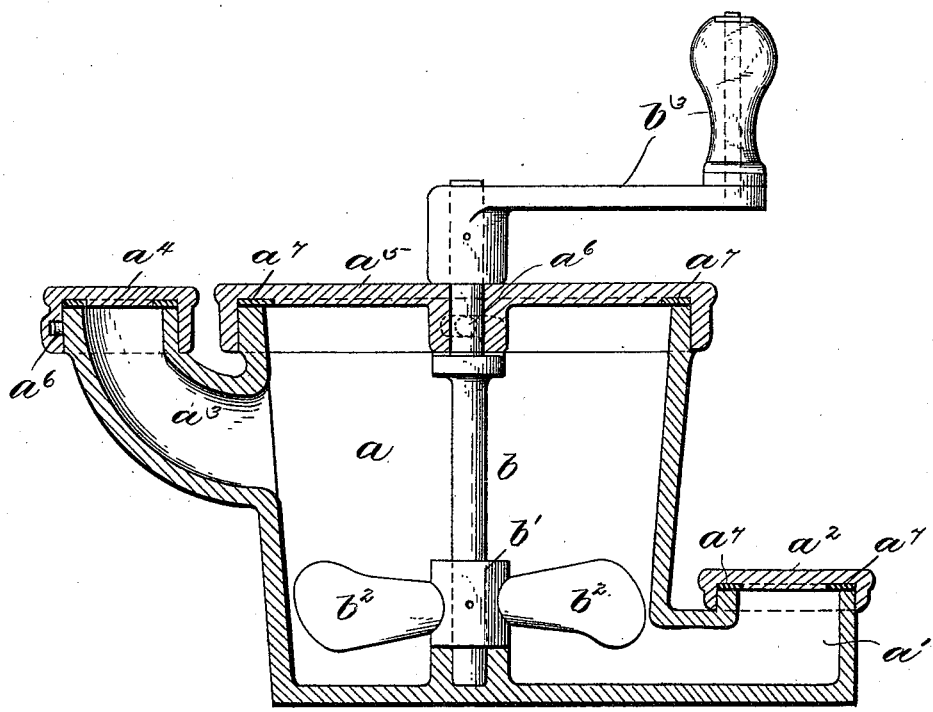

UNITED STATES PATENT OFFICE.

GOODMAN CHARLES MANDLEBERG, HENRY LESSER ROTHBAND, AND SAMUEL LAWRENCE MANDLEBERG, OF MANCHESTER, ENGLAND.

PROCESS OF MANUFACTURING RUBBER GOODS.

SPECIFICATION forming part of Letters Patent No. 441,503, dated November 25, 1890.

Application filed February 5, 1890. Serial No. 339,340. (No specimens.) Patented in England November 14, 1888, No. 16,543; in France March 14, 1889, No. 196,712; in Belgium March 15, 1889, No. 85,405, and in Austria-Hungary August 31, 1889, XXXIX, 1,793, and XXIII, 1,747.

*To all whom it may concern:*

Be it known that we, GOODMAN CHARLES MANDLEBERG, HENRY LESSER ROTHBAND, and SAMUEL LAWRENCE MANDLEBERG, subjects of Her Majesty the Queen of the United Kingdom of Great Britain and Ireland, residing at Manchester, in the county of Lancaster, England, have invented certain new and useful Improvements in the Process of Manufacturing Rubber Goods, (for which we have obtained Letters Patent for the United Kingdom of Great Britain and Ireland, dated November 14, 1888, No. 16,543; in France, dated March 14, 1889, No. 196,712; in Belgium, dated March 15, 1889, No. 85,405; and in Austria-Hungary, dated August 31, 1889, Vol. 39, fol. 1,793, and Vol. 23, fol. 1,747;) and we do hereby declare the following to be a full, clear, and exact description of the invention, such as will enable others skilled in the art to which it appertains to make and use the same, reference being had to the accompanying drawings, and to letters of reference marked thereon, which form a part of this specification.

Our invention relates to the manufacture of india-rubber water-proof garments without disagreeable odor from textures produced by the process or processes and materials hereinafter described.

The india-rubber dough or "mixing" is prepared by dry kneading the india-rubber, which is then soaked for about twenty-four hours in what is commonly known as "deodorized petroleum naphtha" having a specific gravity of about 76° of Baumé's hydrometer; then it is left in a practically air-tight vessel for about twenty-four hours, and during this time it is stirred occasionally; then it is worked two or three times through rollers, after which the dough or mixing is ready to be applied to any suitable fabric in a spreading-machine (the temperature of which is about 80° Fahrenheit) in the ordinary manner. The fabric thus proofed is then "cured" or vulcanized by the process well known as the "cold cure." The garments are made from india-rubber water-proof fabrics prepared as above described, the seams are cemented together by a solution of india-rubber formed by rubber and the naphtha above mentioned, and in order that the cementing solution may be prevented from drying up while in use it is kept in a closed vessel used for containing the above-named naphtha and rubber solution, and a mixing agitator is employed for mixing the rubber solution and naphtha as required and preventing the latter from evaporating. The garments made as above described are hung for a sufficient time in a room or stove at a temperature of about 80° Fahrenheit until they are found to have become practically free from odor, and they may then be scented, if required, by exposing them in the said heated room to some volatile perfume, such as oil of lavender or other scent-giving material, at a suitable temperature.

We have hereinbefore referred to the naphtha solvent as deodorized petroleum naphtha, meaning thereby naphtha which will, when used as a solvent, evaporate in the atmosphere from the material to which it is added, without leaving any appreciable odor behind. As is well known, it is produced by a process or processes ordinarily used—that is, by washing with acids and alkalies and then distilling it, the product thus obtained being a practically deodorized naphtha solvent. By a like method similar deodorized or practically scentless naphtha has also been produced commercially from coal-tar. We therefore use either naphtha which has been deodorized, whether obtained from petroleum or from coal-tar or other like source, in carrying out our invention, but in the latter case (for coal-tar naphtha) the stoving heat should be higher than for deodorized petroleum naphtha, commonly so called.

The drawing hereto annexed is a vertical section and illustrates an apparatus which we find may be used with advantage for mixing the cementing solution and retaining the naphtha, so as to prevent rapid evaporation while being used in cementing the seams of the garments. Other known apparatus may, however, be employed.

*a* is the vessel, at the bottom of which on one side there is a spout *a'*, which can be covered by a closely-fitting cap $a^2$, to prevent the escape of the naphtha spirit. On the other side at the upper end of the vessel there is also a spout $a^3$ with a closely-fitting cap $a^4$. This spout $a^3$ is for filling india-rubber and naphtha into the vessel $a$, the said spout $a^3$ being then covered by a cap $a^4$. The vessel $a$ itself is also covered by a cap $a^5$, which has a boss in its center to form the bearing for a vertical shaft $b$ to pass through, the lower end of which shaft works in a foot-step bearing at the bottom of the inside of the vessel $a$. This shaft $b$ has a boss $b'$ secured upon it, carrying propeller-blades $b^2$, by which the rubber and naphtha are mixed and incorporated together to form the cementing solution. The upper end of the shaft $b$ has a handle $b^3$ for rotating it.

To produce a hermetic closure of the covers $a^2$, $a^4$, and $a^5$, the spouts and vessel may be provided with one or more pins projecting outwardly that take into a groove in the covers, and said groove may be formed on an inclined plane, so as to perform the function of a screw-thread, as shown at $a^6$, and each of said covers may be provided with a gasket or washer of leather $a^7$.

Having described our invention, what we claim, and desire to secure by Letters Patent, is—

1. The herein-described process of manufacturing deodorized rubber garments or goods, which consists in coating a fabric with rubber dissolved in deodorized petroleum naphtha, curing or vulcanizing the coated fabric by the cold process, making the garments from such fabric, and cementing the seams with a solution of rubber in deodorized naphtha, and deodorizing the garments by exposure to heat, substantially as and for the purposes specified.

2. The herein-described process of manufacturing deodorized rubber garments or goods, which consists in coating a fabric with rubber dissolved in deodorized petroleum naphtha, curing or vulcanizing the coated fabric by the cold process, making the garments from such fabric, and cementing the seams with a solution of rubber in deodorized naphtha, and deodorizing the garments by exposure to dry air heated to about 80° Fahrenheit until completely deodorized, substantially as and for the purposes specified.

In testimony whereof we affix our signatures in the presence of two witnesses.

GOODMAN CHARLES MANDLEBERG.
HENRY LESSER ROTHBAND.
SAMUEL LAWRENCE MANDLEBERG.

Witnesses:
PETER J. LIVSEY,
WILLIAM FAULKNER.